United States Patent
Byrne

(10) Patent No.: US 10,764,763 B2
(45) Date of Patent: Sep. 1, 2020

(54) TACTICAL RESCUE WIRELESS BASE STATION

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/235,975

(22) Filed: Dec. 28, 2018

(65) Prior Publication Data

US 2019/0159037 A1 May 23, 2019

Related U.S. Application Data

(63) Continuation of application No. 15/787,266, filed on Oct. 18, 2017, now Pat. No. 10,200,879, which is a
(Continued)

(51) Int. Cl.
*G08B 25/10* (2006.01)
*H04W 4/90* (2018.01)
(Continued)

(52) U.S. Cl.
CPC ............ *H04W 16/26* (2013.01); *G08B 25/10* (2013.01); *G08B 25/14* (2013.01); *G08B 27/006* (2013.01);
(Continued)

(58) Field of Classification Search
CPC ......... H04W 4/02; H04W 4/22; H04W 4/023; H04W 64/00; H04W 4/028; H04W 4/025;
(Continued)

(56) References Cited

U.S. PATENT DOCUMENTS

| 8,736,443 B1 * | 5/2014 | Miasnik | G08B 5/222 340/539.13 |
| 9,051,043 B1 * | 6/2015 | Peeters | B64C 19/00 |

(Continued)

FOREIGN PATENT DOCUMENTS

| GB | 2427791 | 1/2007 |
| KR | 101083056 | 11/2011 |
| WO | WO2016154944 | 10/2016 |

OTHER PUBLICATIONS

Common Alerting Protocol Alert Origination Tools Technology Guide, by U.S. Department of Homeland Security, dated Feb. 2015 (Year: 2015).*

(Continued)

*Primary Examiner* — Daniel Lai
(74) *Attorney, Agent, or Firm* — Lee & Hayes, P.C.

(57) ABSTRACT

Systems, devices, and techniques described herein are directed to a tactical wireless base station, and applications thereof. A tactical wireless base station may include a plurality of hardware or software radios configured to facilitate communication over any wireless protocol. The tactical wireless base station may be deployed on an unmanned aerial vehicle (UAV) to search for a wireless signal of a target user equipment (UE) corresponding to a lost hiker, for example, in an area out of range of traditional base stations, and/or to locate the target UE to convey the location to rescuers. In some instances, a tactical wireless base station can be deployed in a handheld device and may coordinate with other tactical wireless base stations in order to triangulate a location of user equipment. Further, the tactical wireless base stations may be deployed during network outages to provide indications of events, such as during emergencies.

20 Claims, 8 Drawing Sheets

Related U.S. Application Data continuation of application No. 15/367,053, filed on Dec. 1, 2016, now Pat. No. 9,826,415.

(51) Int. Cl.

| | |
|---|---|
| *H04W 16/26* | (2009.01) |
| *G08B 27/00* | (2006.01) |
| *G08B 25/14* | (2006.01) |
| *H04W 8/00* | (2009.01) |
| *G08B 21/10* | (2006.01) |
| *H04W 84/04* | (2009.01) |
| *H04W 84/06* | (2009.01) |
| *H04W 88/08* | (2009.01) |

(52) U.S. Cl.
CPC ............ *H04W 8/005* (2013.01); *G08B 21/10* (2013.01); *H04W 4/90* (2018.02); *H04W 84/047* (2013.01); *H04W 84/06* (2013.01); *H04W 88/08* (2013.01)

(58) Field of Classification Search
CPC ... H04W 64/006; H04W 4/008; H04W 4/021; H04W 84/18; H04W 88/08; H04W 16/26; H04W 8/005; H04W 4/90; H04W 12/06; H04W 4/029; H04W 88/06; H04W 4/12; H04W 4/80; H04W 76/50; H04W 84/12; H04W 4/30; H04W 4/08; H04W 12/08; H04W 4/14; H04W 84/06; H04W 4/50; H04W 4/20; H04W 84/047; H04W 12/00504; H04W 12/10; H04W 48/16; H04W 48/18; H04W 48/20; G08B 25/14; G08B 25/10; G08B 25/016; G08B 25/009; G08B 21/02; G08B 27/005; G08B 27/006; G08B 27/001; G08B 21/10; G08B 25/006; G08B 26/00; G08B 26/007; G08B 27/008; G08B 13/19684; G08B 13/19652; G08B 13/19656; G08B 25/004

See application file for complete search history.

(56) References Cited

U.S. PATENT DOCUMENTS

| | | | |
|---|---|---|---|
| 9,505,494 B1* | 11/2016 | Marlow | B64C 39/024 |
| 9,622,133 B1* | 4/2017 | Guvenc | H04W 36/20 |
| 9,628,318 B1* | 4/2017 | Gerdes | H04L 27/122 |
| 10,102,586 B1* | 10/2018 | Marlow | G06Q 40/08 |
| 2002/0020743 A1 | 2/2002 | Sugukawa et al. | |
| 2005/0285069 A1* | 12/2005 | Fernandez-Sein | F16K 37/0091 251/307 |
| 2008/0030319 A1* | 2/2008 | McKenna | G08B 25/009 340/506 |
| 2008/0077326 A1 | 3/2008 | Funk et al. | |
| 2012/0100868 A1 | 4/2012 | Kim et al. | |
| 2012/0315902 A1 | 12/2012 | Nakahama et al. | |
| 2015/0045063 A1* | 2/2015 | Mishra | H04W 4/02 455/456.2 |
| 2015/0140954 A1* | 5/2015 | Maier | H04W 4/025 455/404.2 |
| 2015/0235540 A1* | 8/2015 | Verna | H04L 67/26 340/539.11 |
| 2016/0216711 A1* | 7/2016 | Srivastava | G08G 5/0013 |
| 2017/0092109 A1* | 3/2017 | Trundle | B64D 47/04 |
| 2017/0251360 A1* | 8/2017 | Adamo, Jr. | H04W 4/90 |
| 2017/0327224 A1* | 11/2017 | Phan | B64C 39/024 |
| 2017/0358222 A1* | 12/2017 | Schubert | G08G 5/0069 |
| 2018/0075759 A1* | 3/2018 | Kim | G08G 5/0069 |
| 2018/0077551 A1* | 3/2018 | Kalathil | H04W 4/70 |

OTHER PUBLICATIONS

CSRIC WG3 EAS Security Subcommittee Report by Communications Security, Reliability and Interoperability Council (CSRIC), dated May 2014 (Year: 2014).*

Office Action for U.S. Appl. No. 15/787,266, dated Apr. 5, 2018, Byrne, "Tactical Rescue Wireless Base Station", 11 pages.

PCT Search Report and Written Opinion dated Feb. 27, 2018 for PCT Application No. PCT/US17/61742, 13 pages.

* cited by examiner

TACTICAL RESCUE WIRELESS BASE STATION

RELATED APPLICATION

This U.S. patent application is a continuation of and claims priority to U.S. patent application Ser. No. 15/787,266, filed Oct. 18, 2017, which is a continuation of and claims priority to U.S. patent application Ser. No. 15/367,053, filed on Dec. 1, 2016, now U.S. Pat. No. 9,826,415, issued Nov. 21, 2017. application Ser. Nos. 15/787,266 and 15/367,053 and U.S. Pat. No. 9,826,415 are fully incorporated herein by reference.

BACKGROUND

Modern telecommunication systems have been deployed widely across population centers and include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies.

However, despite the near ubiquitous implementation of telecommunication systems in population centers, there are still locations that may not support wireless communications, such as national parks or wilderness areas. Further, in disaster situations, installed network devices may not operate correctly to provide wireless communications. Without wireless signals, user equipment may not communicate with a network to request assistance or rescue services, or receive information updates.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
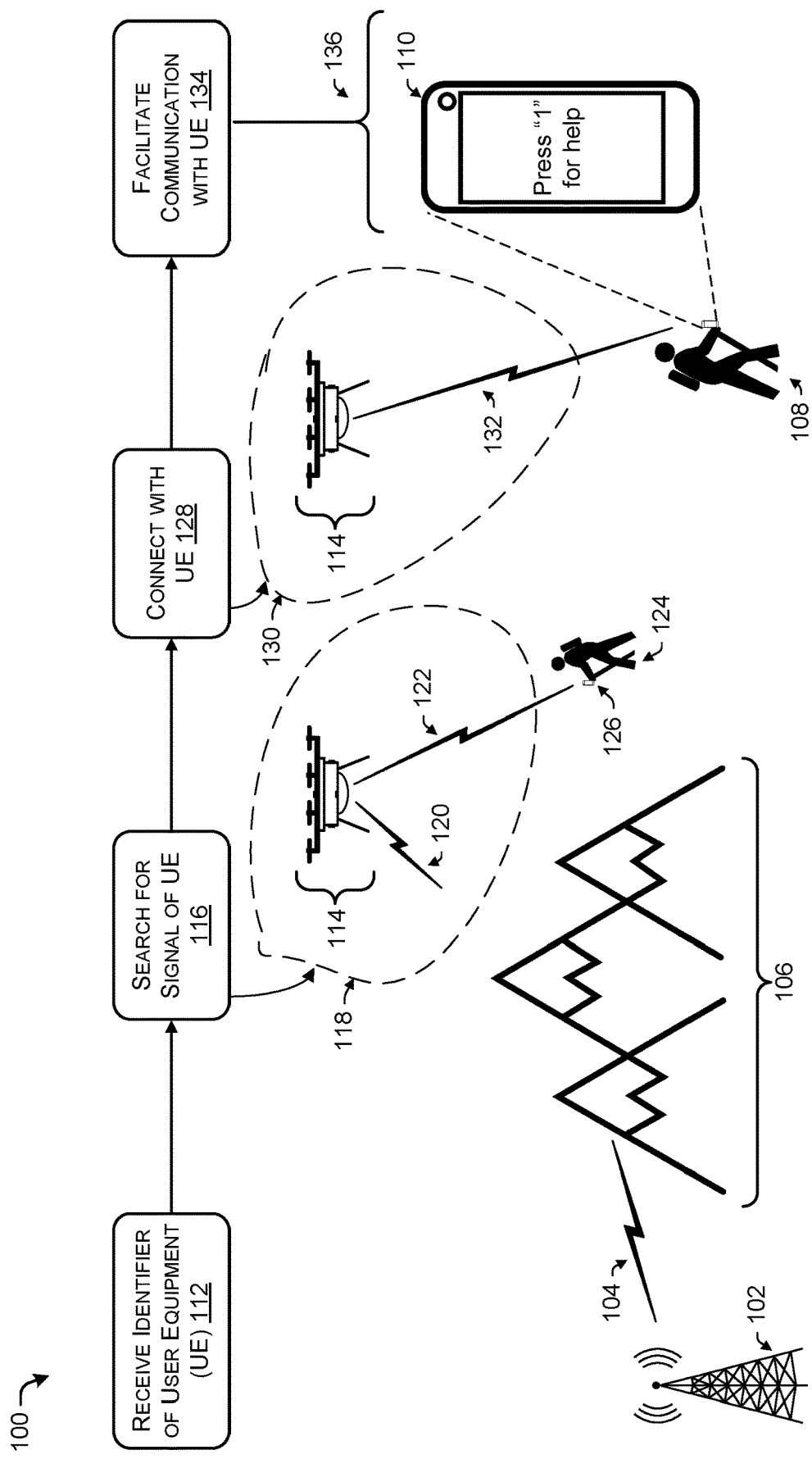
FIG. 1 illustrates a pictorial flow diagram of a process of deploying a tactical wireless base station on an unmanned aerial vehicle to search for a signal of user equipment and to facilitate communication with the user equipment.

The systems, devices, and techniques described herein are directed to tactical wireless base stations and applications thereof. For example, a tactical wireless base station may include a plurality of hardware or software radios configured to facilitate communication over any wireless protocol. In some instances, a tactical wireless base station may be deployed on an unmanned aerial vehicle (UAV) to search for a wireless signal of a target user equipment (UE) corresponding to a lost hiker, for example, in an area out of range of traditional base stations, and/or to locate the target UE to convey the location to rescuers. In some instances, a tactical wireless base station can be deployed in a handheld device and may coordinate with other tactical wireless base stations in order to triangulate a location of user equipment. In some instances, the tactical wireless base station may communicate with user equipment via a one-way or two-way communication. In some instances, the tactical wireless base station can communicate with user equipment via Wireless Emergency Alerts and/or via the Commercial Mobile Alert System.

A tactical wireless base station may be deployed to provide alerts to a plurality of user equipment to alert users to a pending emergency, such as a tsunami, or following an event that caused network outage, such as an earthquake. For example, a tactical wireless base station may be deployed on an unmanned aerial vehicle (UAV) along a coastline to deliver alerts to user equipment of an imminent tsunami, for example, to encourage users to move to safety. In some instances, the tactical wireless base station may interface with wirelessly enabled device (e.g., devices in the Internet of Things (IOT)) to instruct the devices to perform actions and/or prepare for or respond to an emergency situation.

A tactical wireless base station may be configured to search for a particular user equipment (e.g., a target UE), to communicate with rescuers or emergency personnel (e.g., a searching UE), and/or to communicate with one or more third party UEs encountered along the way. The tactical wireless base station may include a plurality of hardware or software based radios to communicate with any wireless protocol. The tactical wireless base station may determine a location of a target UE via triangulation techniques including determining a received signal strength indication (RSSI) of a target signal at various locations and providing directionality towards a source of the target signal. In some instances, tactical wireless base stations may coordinate to exchange signal strength indications to improve target UE location. The tactical wireless base station may include authentication to authenticate to user equipment a reliability of communication, alerts, messages, and/or instructions. These and other aspects of the disclosure are discussed herein.

In this manner, the systems, devices, and techniques described herein improve a functioning of a network by providing a wireless network where no wireless network is available. Further, a tactical wireless base station can be deployed to act as an intermediate link between user equipment and a fixed base station, and can be deployed to provide additional capacity when a network performance is degraded or unreliable (e.g., in an emergency). These and other improvements to the functioning of a network are discussed herein.

The systems, devices, and techniques described herein can be implemented in a number of ways. Example implementations are provided below with reference to the following figures.

FIG. 1 illustrates a pictorial flow diagram of a process 100 of deploying a tactical wireless base station on an unmanned aerial vehicle to search for a signal of user equipment and to facilitate communication with the user equipment. The process 100 is illustrated with a base station 102 transmitting a signal 104 that is blocked by an obstruction, such as a mountain 106. Further, a hiker 108 may be lost or injured, and may be unable to communicate with the base station 102 via user equipment 110 (e.g., a smartphone) carried by the hiker 108. Thus, in this example, the hiker 108 may be presumed lost and in need of rescue. Although discussed in the context of a hiker, it may be understood that the operations described herein are not limited to hiking, and may be applicable to locating any user or user equipment. For example, user equipment may include, and is not limited to, one or more servers, smart phones, mobile phones, cell phones, tablet computers, portable computers, laptop computers, personal digital assistants (PDAs), electronic book devices, or any other electronic devices that can generate, request, receive, transmit, or exchange voice, video, and/or digital data.

At 112, the operation may include receiving an identifier of a user equipment (UE). For example, an identifier may correspond to the user equipment 110 carried by the hiker 108 who is missing or lost. In some instances, the identifier may include an international mobile station equipment identity (IMEI), an international mobile subscriber identity (IMSI), a mobile identification number (MIN), a mobile subscription identification number (MSIN), electronic serial number (ESN), media access control address (MAC address), Internet protocol address (IP address), a wireless protocol address such as a BLUETOOTH address, etc. In some instances, the identifier may be received at a centralized server (discussed below) and provided to a tactical wireless base station deployed on an unmanned aerial vehicle 114. The operation 112 may further include receiving a last-known location of the hiker 108 (e.g., via trip plans or by checking call logs to determine a last base station in contact with the UE 110) or may include receiving an intended destination of the hiker 108.

At 116, the operation may include searching for a signal of user equipment. In some instances, the operation 116 may include searching for user equipment (e.g., a target UE) corresponding to the identifier received in the operation 112. As illustrated in example 118, the UAV 114 may operate in a particular area associated with the hiker 108. In some instances, the operation 116 may include transmitting and receiving a plurality of wireless signals corresponding to a plurality of wireless protocols, illustrated as wireless signals 120 and 122. In some instances, the UAV 114 may transmit the wireless signals 120 and 122 to search for user equipment. In some instances, the operation 116 may include establishing a communication with a third party hiker 124 carrying a third party user equipment 126. In some instances, the operation 116 may be performed any number of times or may be performed continuously until the hiker 108 is located.

At 128, the operation may include connecting with user equipment. In an example 130, the UAV 114 including the tactical wireless base station may transmit and/or receive a signal 132 with the user equipment 110. In some instances, the UE 110 may correspond to the target UE, or may correspond to a third party UE.

At 134, the operation may include facilitating communication with user equipment. For example, for the UE connected in the operation 128, the operation 134 may include transmitting and/or receiving unidirectional or bidirectional communication with the UE 110. As illustrated in an example 136, the operation 134 may include transmitting a message "Press '1' for help" to the UE 110 of the hiker 108. If the hiker is lost or in need of rescue, the hiker 108 may respond to the communication facilitated in the example 136. In some instances, the operation 136 may include transmitting instructions to the hiker 108 (e.g., "stay put") or may provide a connection between the UAV 114 and the base station 102 (e.g., as an intermediary between the UE 110 and the base station 102) so that the hiker 108 may transmit or receive wireless data. In some instances, the operation 134 may include capturing audio and/or video of the hiker 108, and in some instances, the operation 134 may include confirming an identity of the hiker 108, and relaying a location of the hiker 108 to the third party hiker 124, rescue personnel, or other recipients. If connecting to a third party UE (such as the UE 126), the operation 134 may include a message asking the third party hiker 124 to look out for a missing hiker, or a message directing the third party hiker 124 towards the hiker 108 to render aid.

Figure 2:
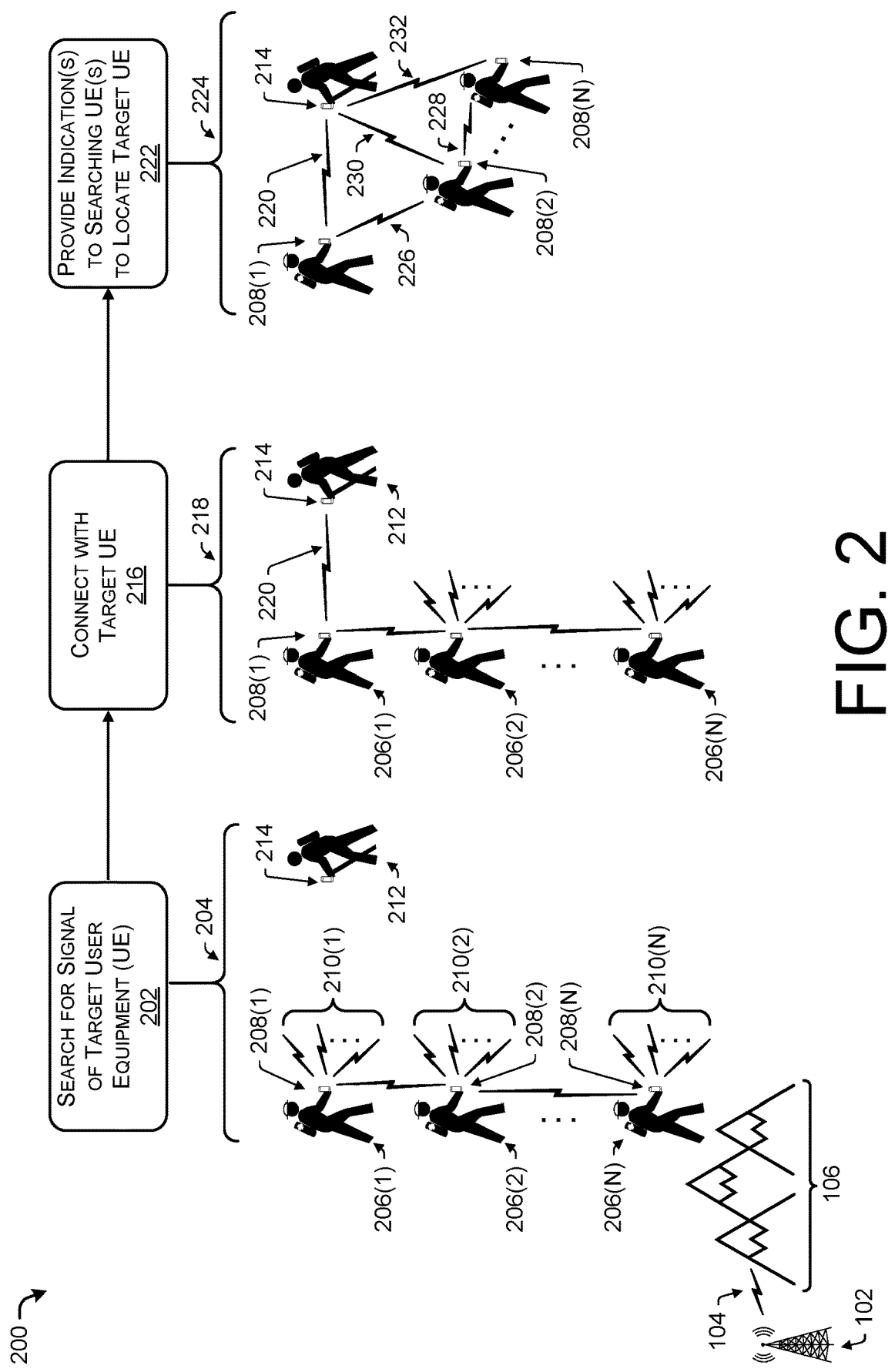
FIG. 2 illustrates a pictorial flow diagram of a process of deploying a plurality of tactical wireless base stations to connect with a target user equipment, and to provide indications to locate the target user equipment.

FIG. 2 illustrates a pictorial flow diagram of a process 200 of deploying a plurality of tactical wireless base stations to connect with a target user equipment, and to provide indications to locate the target user equipment. In some instances, aspects of the process 200 can be combined with aspects of the process 100 (and vice versa) to provide multi-level searching (e.g., UAV-based and personnel-based searching). In some instances, the process 200 may include an operation similar to the operation 112 of FIG. 1.

As illustrated, FIG. 2 may include the base station 102 providing the wireless signal 104 that is blocked by an obstruction, such as the mountain 106.

At 202, the operation may include searching for a signal of a target user equipment. As illustrated in example 204, one or more searchers 206(1), 206(2), . . . , 206(N) (collectively referred to as searchers 206) may each include a tactical wireless base station 208(1), 208(2), . . . , 208(N) (collectively referred to as tactical wireless base stations 208) implemented as a handheld device. Further, in some instances, each of the tactical wireless base stations 208 may transmit or receive a plurality of wireless protocols, represented by signals 210(1), 210(2), . . . , 210(N). For example, the tactical wireless base stations may be configured to transmit or receive on wireless protocols including, but not limited to, 2G, 3G, 4G, LTE, BLUETOOTH, BLUETOOTH LOW ENERGY, LORAWI-FI, WIRELESSHD, WIGIG, Z-WAVE, ZIGBEE, AM/FM, RFID, NFC, etc. Thus, by transmitting and/or receiving a wide range of wireless signals, the tactical wireless base station may increase a probability of detecting any signals emitted by a lost hiker, such as a hiker 212 including a user equipment 214. In some instances, the operation 202 may include filtering any number of signals, or limiting or restricting a number of wireless protocols to search, which in some instances, may reduce a number of false positives while searching.

At 216 the operation may include connecting with a target user equipment (UE), such as the user equipment 214 of the hiker 212. An example 218 illustrates a time after the example 204, whereby one or more of the searchers 206 has moved towards the hiker 212. In the example 218, the tactical wireless base station 208(1) has established a connection 220 with the target UE 214 of the hiker 212. In some instances, the operation 216 may include determining a received signal strength indication (RSSI) of the connection 220, or other operations to determine a signal strength and/or position of the target UE 214.

At 222, the operation may include providing indication(s) to searching user equipment (UE) to locate the target UE. An example 224 illustrates a time after the example 218, whereby one or more of the searchers 206 has moved towards the hiker 212. As illustrated in the example 224, the operation 222 may include providing one or more signals to the tactical wireless base stations that one of the tactical wireless base stations 208 has established a connection (e.g., the connection 220) with the target UE 214. For example the tactical wireless base station 208(1) can provide an indication 226 to the tactical wireless base station 208(2), which in turn may provide an indication 228 to the tactical wireless base station 208(N). In some instances, the indications 226 and 228 may include a location of the tactical wireless base station (e.g., 208(1) and/or 208(2)), a RSSI of the connection 220, and a suggested direction for the searchers 206 to head to optimize a probability of establishing a connection (e.g., a connection 230 and 232 with the target UE 214, respectively). Based on receiving the indications 226 and 228, respectively, the searchers 206 may alter a direction of travel. In some instances, the operation 222 may be repeated as changes in a status of one or more connections 220, 230, and/or 232 (e.g., as signal strength increases to decreases) to facilitate locating the target UE 214.

The process 200 may further include facilitating communication with the target UE 214, similar to that described in connection with the operation 134 of FIG. 1.

Figure 3:
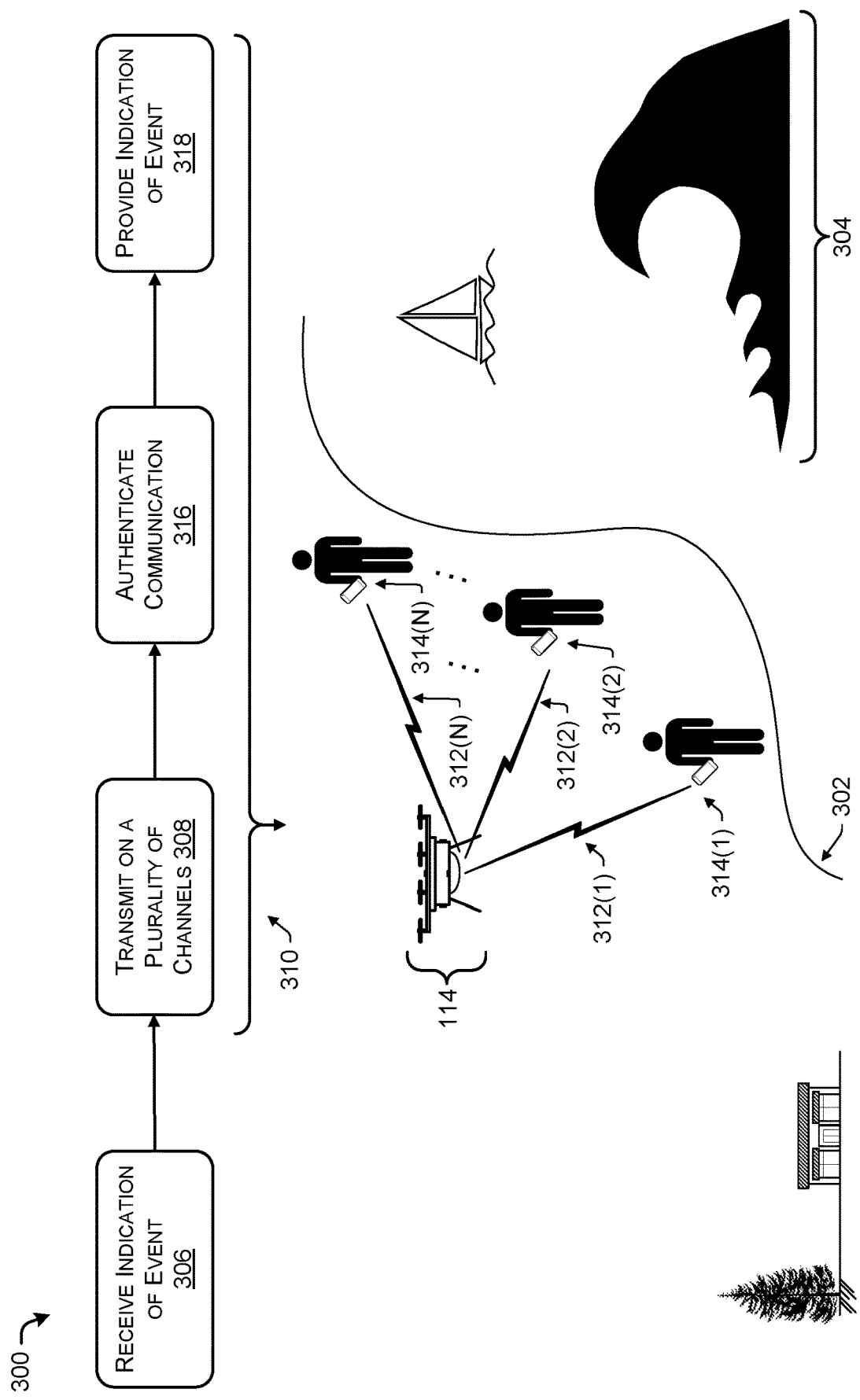
FIG. 3 illustrates a pictorial flow diagram of a process of deploying a tactical wireless base station during a network outage, for example, to provide event indications.

FIG. 3 illustrates a pictorial flow diagram of a process 300 of deploying a tactical wireless base station during a network outage, for example, to provide event indications. In some instances, aspects of the process 300 can be combined with aspects of the processes 100 and/or 200 (and vice versa) to provide multi-level searching in addition to providing indications of events. As illustrated, FIG. 3 represents a coastline 302 exposed to an event, such as a tsunami 304. Although described in the context of a coastline and tsunami, it may be understood that the process 300 may be performed in a variety of situations and is not limited to this context.

At 306, the operation may include receiving an indication of an event. For example, an event may be an impending tsunami, an earthquake, an impending solar flare, a tornado, a hurricane, a storm, etc. In some instances, the event may be an "all clear" indication, such as an indication that a threat of a tsunami has passed. In some instances, the operation 306 may include receiving the indication from a government agency, such as the National Weather Service or the National Oceanic and Atmospheric Administration, from a police department or fire department, from a news agency, etc. In some instances, the operation 306 may include receiving the indication at a centralized server and deploying a tactical wireless base station on the UAV 114 to provide indications of the event, as discussed herein.

At 308, the operation may include transmitting on a plurality of channels to establish a communication with a plurality of user equipment. For example, the tactical wireless base station may transmit on any wireless channel or using any wireless protocol. As illustrated in example 310, the tactical wireless base station transmits signals 312(1), 312(2), . . . , 312(N) (collectively referred to as signals 312) to various user equipment 314(1), 314(2), . . . , 314(N) (collectively referred to as user equipment 314).

At 316, the operation may include authenticating a communication with user equipment. For example, the operation 314 may include providing a code, password, identification number, public encryption key or a private encryption key to authenticate that the tactical wireless base station is authorized to communicate with the UEs 314 via an emergency alert system. In some instances, due to the nature of the alert (e.g., a tsunami alert) the operation 316 reduces abuse of the alert system.

At 318, the operation may include providing an indication of the event to the user equipment. For example, the tactical wireless base station may provide any audio, video, text, haptic, etc., indication to the user equipment. In some instances, the operations 308, 316, and/or 318 may be repeated for each UE detected by the tactical wireless base station, and in some instances, the process 300 may include navigating the UAV 114 based at least in part on detected UEs and/or whether a communication with the UE has been attempted, is in process, and/or is completed. For example, the UAV 114 may remain in range or remain in communication with a UE until a communication has been confirmed that the indication has been provided to the UE.

Figure 4:
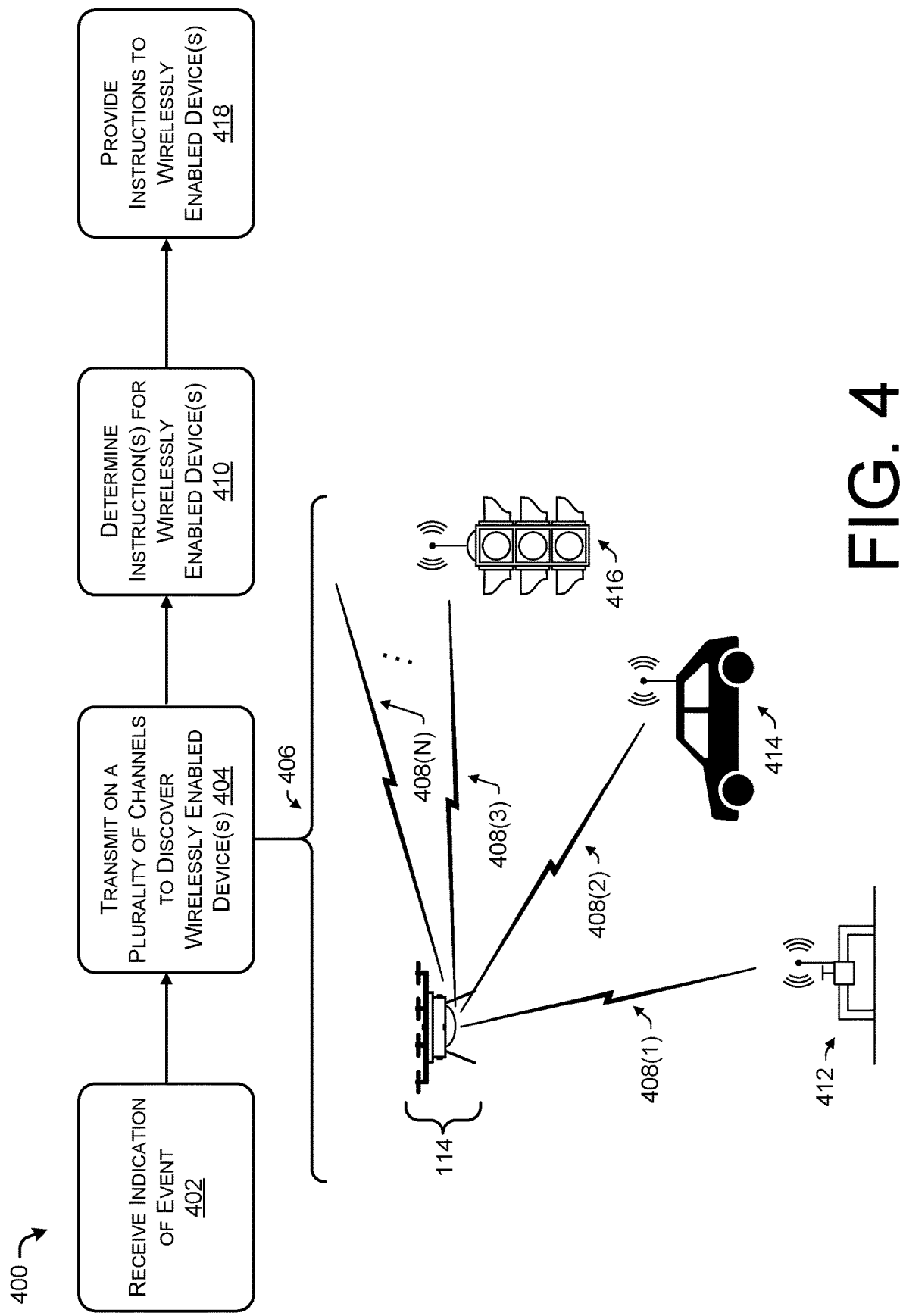
FIG. 4 illustrates a pictorial flow diagram of a process of deploying a tactical wireless base station to provide instructions to wirelessly enabled devices.

FIG. 4 illustrates a pictorial flow diagram of a process 400 of deploying a tactical wireless base station to provide instructions to wirelessly enabled devices. In some instances, aspects of the process 400 can be combined with aspects of the processes 100, 200, and/or 300 (and vice versa) to provide multi-level searching in addition to providing indications of events and instructions to wirelessly enabled devices. In one example, a tactical wireless base station can be deployed on the UAV 114 to provide indications of an event to user equipment (e.g., of a tsunami, as described in connection with FIG. 3), and provide instructions to wirelessly enabled devices (e.g., a gas valve) to perform an operation (e.g., shut off the valve) in preparation of or in response to the event, as described herein.

At 402, the operation can include receiving an indication of an event. In some instances, the operation 402 may correspond to the operation 306 in FIG. 3. In some instances, the operation 402 can include receiving one or more commands or instructions to be relayed to one or more wirelessly enabled device based at least in part on the event. Further, the operation 402 can include receiving waypoints, navigation instructions, and/or a route directing the UAV 114 including the tactical wireless base station to perform the operations of FIG. 4.

At 404, the operation can include transmitting on a plurality of channels to discover one or more wirelessly enabled devices. In an example 406, the UAV 114, for example, can transmit (and/or receive) on the plurality of channels, represented as signals 408(1), 408(2), 408(3), . . . , 408(N) (collectively referred to as signals 408). In some instances, the signals 408 may be transmitted to a particular wirelessly enabled device, and in some instances, the operation 404 may include searching for a particular wirelessly enabled device. In some instances, the signals 408 may be received by any device capable of receiving the transmission (e.g., the transmission in not directed to a particular device).

At 410, the operation may include determining instructions for one or more wirelessly enabled devices. The operation 410 may include determining a type of the wirelessly enabled device, and determining one or more instructions for that wirelessly enabled device based on the type of the wirelessly enabled device. For example, in some instances, the signal 408(1) may be received by a wirelessly enabled device 412, which may correspond to a wirelessly-actuated valve, such as for a gas line. Determining an instruction to be transmitted to the wirelessly enabled device 412 may include determining a capability of the device 412. For example, the wirelessly enabled device 412 may be configured to remotely open or close a valve. In another example, the signal 408(2) may be received by a wirelessly enabled device 414, which may correspond to an autonomous vehicle. Determining an instruction for the device 414 may include determining driving instructions to direct the device 414 to a particular location, for example, to evacuate personnel. In another example, the signal 408(3) may be received by a wirelessly enabled device 416, which may correspond to a remotely-activated traffic signal. For example, determining instructions for the device 416 may include determining a traffic pattern to facilitate transportation, for example, during evacuation during an emergency.

At 418, after instructions have been determined for a wirelessly enabled device, the instructions can be transmitted to the wirelessly enabled device, respectively. For example, the signal 408(1) may include instructions to open or lose the valve of the device 412. The signal 408(2) may include driving directions for the autonomous vehicle, and the signal 408(3) may include controls to control a flow of traffic by changing lights on the traffic light. These and other example are contemplated within the scope of the disclosure.

Figure 5:
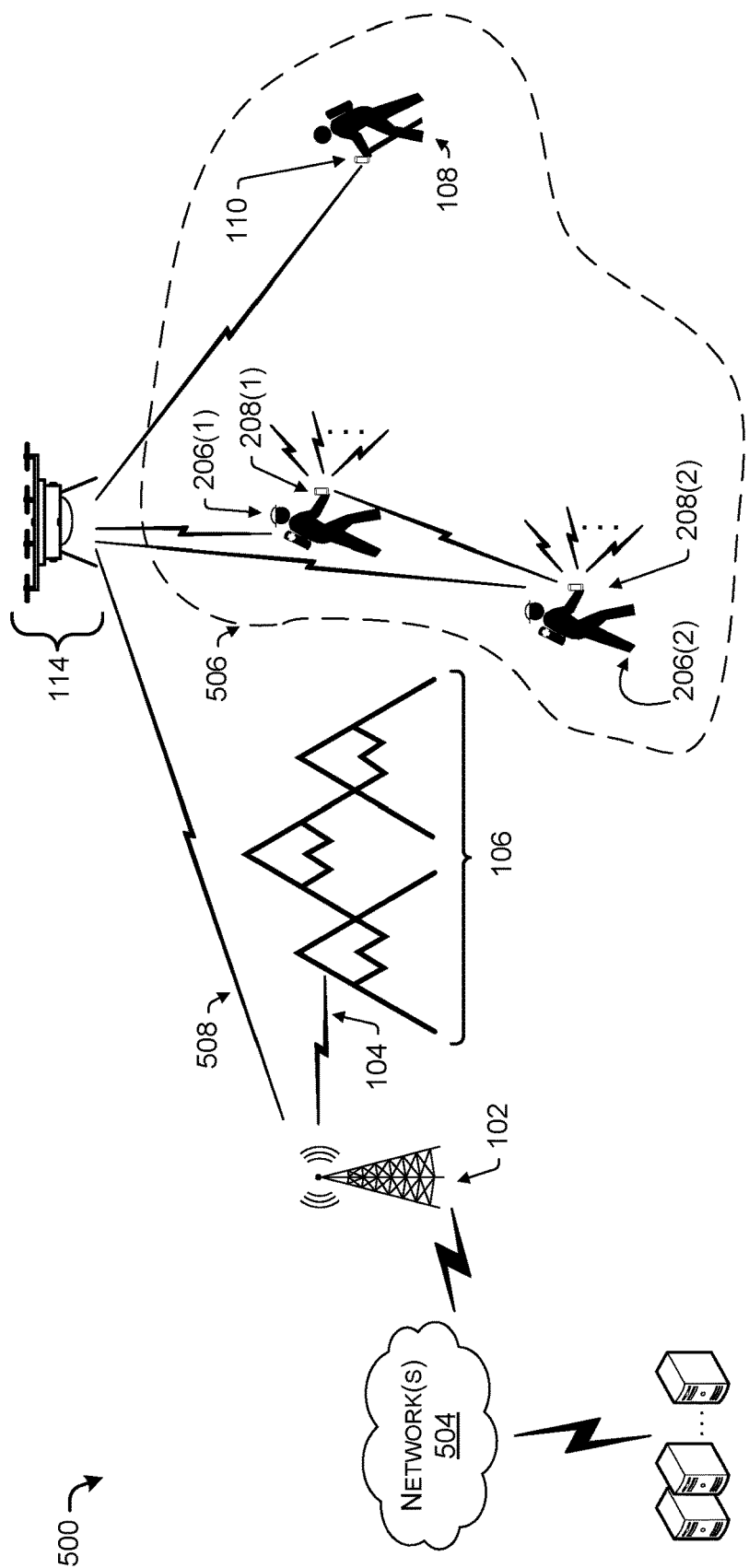
FIG. 5 illustrates an example environment for operating one or more tactical wireless base stations in conjunction with a centralized server.

FIG. 5 illustrates an example environment 500 for operating one or more tactical wireless base stations in conjunction with a centralized server. In some instances, the processes 100, 200, 300, and/or 400 can be implemented using some or all of the components described in the environment 500. In some instances, the environment 500 can include one or more centralized servers 502 in communication with the base station 102 via one or more networks 504. For example, the network(s) 504 may include any wired or wireless networks to facilitation communication, such as a LAN, WAN, the Internet, a backhaul network, etc. The base station 102 may provide wireless signals 104 that may be blocked by the mountain 106, thereby resulting in an area 506 that has a degraded wireless signal, or does not support wireless communication with the base station 102, absent the tactical wireless base station deployed on the UAV 114, as discussed herein. For example, the base station 102 can communicate with the tactical wireless base station deployed on the UAV 114 via one or more signals 508.

In turn, the tactical wireless base station deployed on the UAV 114 may be in communication with one or more searchers 206(1) and 206(2) via the tactical wireless base stations 208(1) and 208(2) proximate to or carried by the searchers 206(1) and 206(2). As discussed herein, the tactical wireless base stations can transmit a plurality of signals to search for a wireless signal transmitted by the target user equipment 110 carried by the hiker 108, for example. In some instances, the centralized server 502 can coordinate activities of the UAV 114 and the searchers 206 to quickly locate the hiker 108, based on signals provided by the target user equipment 110.

Figure 6:
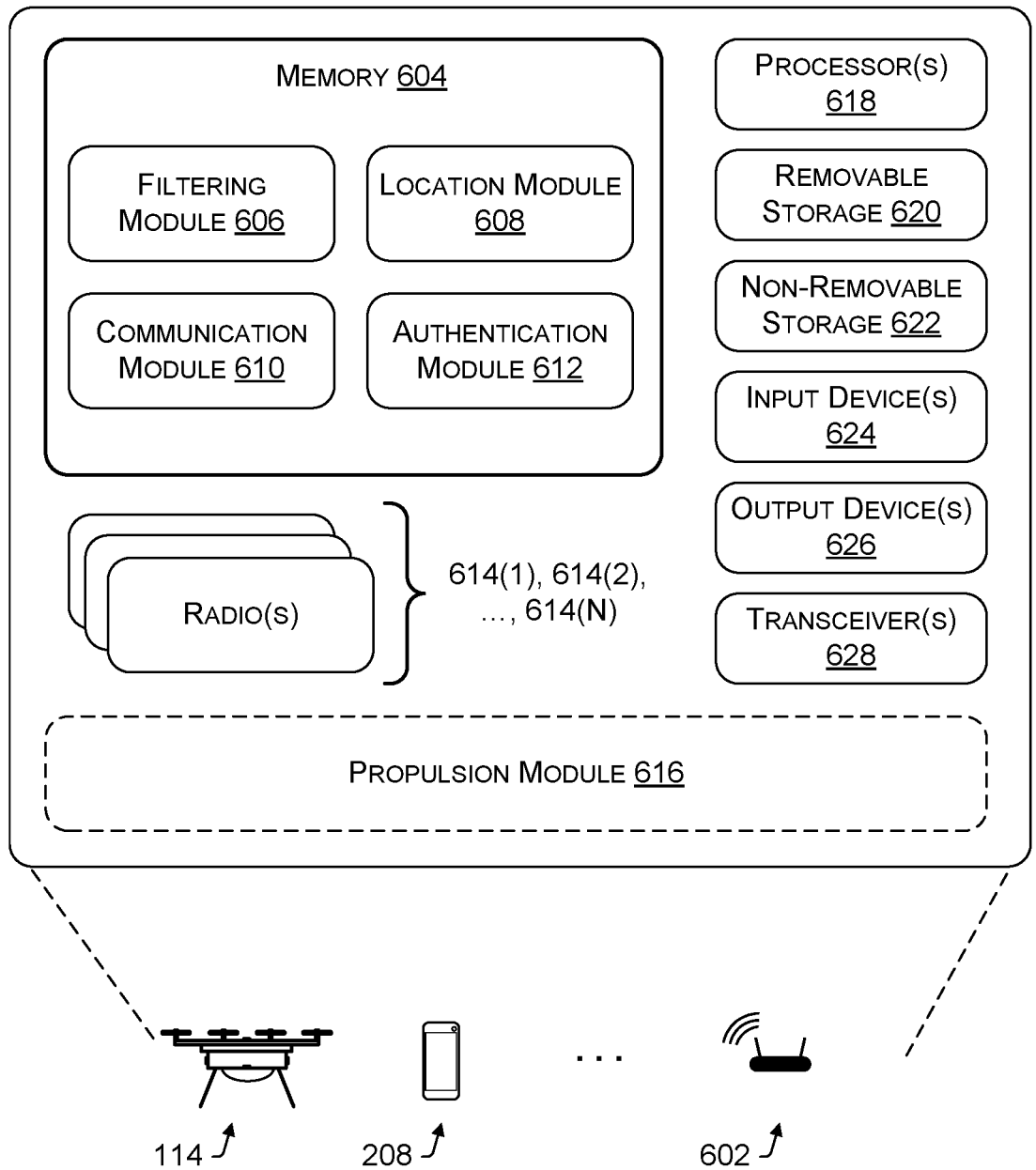
FIG. 6 illustrates an exemplary tactical wireless base station.

FIG. 6 illustrates an example tactical wireless base station 600 (also referred to as a base station 600). As discussed herein, the base station 600 can be deployed in a variety of devices, including but not limited to the unmanned aerial vehicle 114, the handheld device 208, and a stationary base station 602. Further, the base station 600 can be implemented in any sort of device capable of engaging in wired or wireless communication with other, remote devices. Thus, the base stations 600 can include, but are not limited to, servers, smart phones, mobile phones, cell phones, tablet computers, portable computers, laptop computers, personal digital assistants (PDAs), electronic book devices, or any other electronic devices that can generate, request, receive, transmit, or exchange voice, video, and/or digital data.

As illustrated, the base station 600 comprises a memory 604 storing a filtering module 606, a location module 608, a communication module 610, and an authentication module 612. Also, the base station 600 may include one or more hardware or software defined radios 614(1), 614(2), . . . , 614(N). The base station 600 may include a propulsion module 616, and in some instances, the base station 600 may be deployed in a vehicle (e.g., a UAV) such that the base station 600 may not include the propulsion module 616. Also, the base station 600 includes processor(s) 618, a removable storage 620 and non-removable storage 622, input device(s) 624, output device(s) 626, and transceiver(s) 628.

In various embodiments, memory 604 is volatile (such as RAM), non-volatile (such as ROM, flash memory, etc.) or some combination of the two. The filtering module 606, the location module 608, the communication module 610, and the authentication module 612 stored in the memory 604 can comprise methods, threads, processes, applications or any other sort of executable instructions. The filtering module 606, the location module 608, the communication module 610, and the authentication module 612 can also include files and databases.

In some embodiments, the filtering module 606 can include functionality to filter received signals to distinguish between a target user equipment (e.g., the UE 110) and a third party user equipment (e.g., the UE 124). For example, the filtering module 606 can receive an identifier associated with the target UE and can compare received signals or information associated with UEs encountered by the base station 600 to identify the target UE.

In some embodiments, the location module 608 can include functionality to determine a location of the base station 600 and/or to determine a location of user equipment encountered by the base station 600. For example, the location module 608 can receive location information from a GPS sensor (global positioning system) included in the base station 600. In some instances, the location module can correlate a location of the base station 600 with a reception of a signal from a UE and a direction of travel of the base station 600 to triangulate a location of the UE. In some instances, the location module 608 can transmit a location of the base station 600 to another base station, or receive a location of another base station, in conjunction with determining a location of a user equipment. In some instances, the location module 608 can store locations of third party UE and/or searcher UE encountered in a search (e.g. where the base station 600 is deployed on a UAV) to return to a location associated with the UE.

In some embodiments, the communication module 610 can include applications, indications, or instructions to facilitate communication with a UE connected to the base station 600. For example, when the base station 600 encounters a target UE, the communication module 610 can act as an intermediary between the target UE and a fixed base station (e.g., the base station 102) if such a connection is available. In some instances, the communication module 610 can relay instructions to a target UE (e.g., "stay put") and in some instances, the communication module 610 can query a target UE (e.g., "are you a lost hiker?", "press '1' if you need help", etc.).

In some embodiments, the authentication module 612 can include encryption or access codes to enable the base station 600 to provide alerts and/or instructions to various UE or wirelessly enabled devices. For example, the authentication module 612 may include an encryption key to encrypt instructions to ensure that instructions provided to a wirelessly enabled device are valid instructions, or to ensure that an event indication (e.g., of an imminent tsunami) is a valid event indication.

In some embodiments, the radios 614(1), 614(2), . . . , 614(N) (collectively referred to as radios 614) can include functionality to transmit and/or receive a plurality of wireless signals using any wireless protocols. For example, the radios 614 can implement one or more technologies including 2G, 3G, 4G, LTE, BLUETOOTH, BLUETOOTH LOW ENERGY, LORAWI-FI, WIRELESSHD, WIGIG, Z-WAVE, ZIGBEE, AM/FM, RFID, NFC, satellite radio, satellite phone, etc. Thus, the radios 616 can implement GSM, UMTS, and/or LTE/LTE Advanced telecommunications technologies using terrestrial or satellite transceivers. Further, the base station 600 can provide network functionality including, but not limited to those provided by the following devices: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between network nodes, devices, the centralized server 102, and/or remote devices in other networks. Further, it is understood in the context of this disclosure that the techniques discussed herein can also be implemented in other networking technologies, such as nodes that are part of a wide area network (WAN), metropolitan area network (MAN), local area network (LAN), neighborhood area network (NAN), personal area network (PAN), or the like.

In some embodiments, the propulsion module 616 can include functionality to navigate the base station 600 as an unmanned aerial vehicle (UAV) or as an autonomous or remotely operated vehicle. For example, the propulsion module 616 can include one or more power sources, motors, propellers, control and navigation systems, etc., to implement the base station 600 as deployable platform. In some instances, the base station 600 may not include the propulsion module 616, and may instead by deployed on another platform such as a UAV, a vehicle, a boat, a fixed-wing aircraft, a balloon, etc.

In some embodiments, the processor(s) 618 is a central processing unit (CPU), a graphics processing unit (GPU), or both CPU and GPU, or other processing unit or component known in the art.

The base station 600 also includes additional data storage devices (removable and/or non-removable) such as, for example, magnetic disks, optical disks, or tape. Such additional storage is illustrated in FIG. 6 by removable storage 620 and non-removable storage 622. Tangible computer-readable media can include volatile and nonvolatile, removable and non-removable media implemented in any method or technology for storage of information, such as computer readable instructions, data structures, program modules, or other data. Memory 604, removable storage 620 and non-removable storage 622 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the base station 600. Any such tangible computer-readable media can be part of the base station 600.

The base station 600 can include input device(s) 624, such as a keypad, a cursor control, a touch-sensitive display, image sensors (e.g., to identify a hiker), GPS receiver, etc. Also, the base station 600 can include output device(s) 626, such as a display, speakers, etc. These devices are well known in the art and need not be discussed at length here.

As illustrated in FIG. 6, the base station 600 can include one or more wired or wireless transceiver(s) 628. In some wireless embodiments, to increase throughput, the transceiver(s) 628 can utilize multiple-input/multiple-output (MIMO) technology. The transceiver(s) 628 can be any sort of wireless transceivers capable of engaging in wireless, radio frequency (RF) communication. In some instances, the transceiver(s) 628 may operate in conjunction with or instead of the radios 614 to provide the wireless communication using a plurality of wireless protocols.

Figure 7:
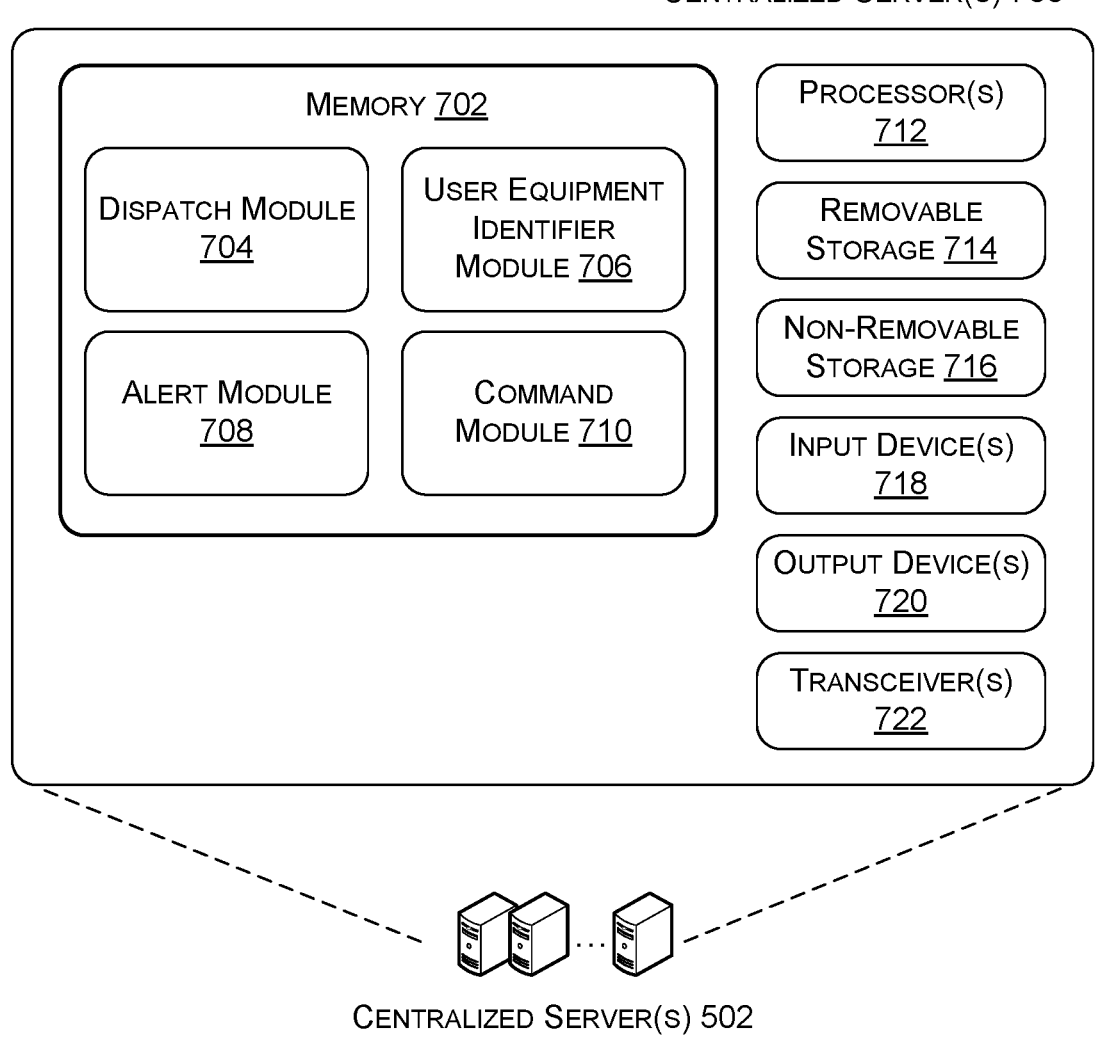
FIG. 7 illustrates an exemplary centralized server configured to interact with a tactical wireless base station.

FIG. 7 illustrates an example centralized server 700 configured to interact with a tactical wireless base station. In some embodiments, the centralized server 700 can correspond to the centralized server 502 of FIG. 5, and may be used to implement the various operations described in connection with FIGS. 1-5. It is to be understood in the context of this disclosure that the centralized server 700 can be implemented as a single device or as a plurality of devices with modules and data distributed among them. For example, the centralized server may include memory 702 storing a dispatch module 704, a user equipment identifier module 706, an alert module 708, and a command module 710 to support the tactical wireless base station to identify user equipment and provide alerts and commands, as described herein. Also, the centralized server 700 includes processor(s) 712, a removable storage 714 and non-removable storage 716, input device(s) 718, output device(s) 720, and transceiver(s) 722.

In various embodiments, memory 702 is volatile (such as RAM), non-volatile (such as ROM, flash memory, etc.) or some combination of the two. The dispatch module 704, the user equipment identifier module 706, the alert module 708, and the command module 710 stored in the memory 702 can comprise methods, threads, processes, applications or any other sort of executable instructions. The dispatch module 704, the user equipment identifier module 706, the alert module 708, and the command module 710 can also include files and databases.

In particular, the dispatch module 704 can include functionality for dispatching or deploying one or more tactical base stations to identify user equipment, provide indications of events, and provide instructions to wirelessly enabled devices. The dispatch module 704 may receive a last-known location of a hiker (e.g., via trip plans or by checking call logs to determine a last base station in contact with the user equipment) or may include receiving an intended destination of a hiker. The dispatch module 704 can provide a navigation route for a UAV to travel and perform operations as described herein, and/or the dispatch module can determine a number of tactical base stations to be deployed as handheld devices. The dispatch module 704 can coordinate movement or communication between the various tactical base stations that are deployed in an area.

The user equipment identifier module 706 can include functionality to receive information partially or uniquely identifying a user equipment to be found. For example, the user equipment identifier may include an international mobile station equipment identity (IMEI), an international mobile subscriber identity (IMSI), a mobile identification number (MIN), a mobile subscription identification number (MSIN), electronic serial number (ESN), media access control address (MAC address), Internet protocol address (IP address), wireless protocol address such as a BLUETOOTH address, etc. In some instances, the identifier may be received at a centralized server and provided to a tactical wireless base station deployed on an unmanned aerial vehicle 114.

The alert module 708 can include functionality to receive alerts (e.g., from a weather service, police department, fire department, etc.) and configure the alerts to be deployed to the tactical wireless base stations and user equipment. The alert module 708 can set a geolocation defining an area in which user equipment may receive an alert. For example, particular alerts may be more relevant in one region than another (e.g., a coastline for a tsunami alert). In some instances, the alert module 708 can include a database that tracks aspects of the user equipment (e.g., an identity) that receive the alerts.

The command module 710 can include functionality to receive, determine, and distribute commands for wirelessly enabled devices to tactical wireless base stations for implementation as described herein. For example, the command module 710 can determine navigation instructions that can be deployed to an autonomous vehicle. In another example, the command module 710 can determine to open or close a valve for a wirelessly controlled valve (e.g., on a gas line). In some instances, the command module 710 can include a database including any capabilities of devices, as well as an interface for implementing the commands based on the capabilities.

In some embodiments, the processor(s) 712 is a central processing unit (CPU), a graphics processing unit (GPU), or both CPU and GPU, or other processing unit or component known in the art.

The centralized server 700 also includes additional data storage devices (removable and/or non-removable) such as, for example, magnetic disks, optical disks, or tape. Such additional storage is illustrated in FIG. 7 by removable storage 714 and non-removable storage 716. Tangible computer-readable media can include volatile and nonvolatile, removable and non-removable media implemented in any method or technology for storage of information, such as computer readable instructions, data structures, program modules, or other data. Memory 702, removable storage 714 and non-removable storage 716 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 700. Any such tangible computer-readable media can be part of the centralized server 700.

The centralized server 700 also can include input device(s) 718, such as a keypad, a cursor control, a touch-sensitive display, voice input device, etc., and output device(s) 720 such as a display, speakers, printers, etc. These devices are well known in the art and need not be discussed at length here.

As illustrated in FIG. 7, the centralized server 700 also includes one or more wired or wireless transceiver(s) 722. For example, the transceiver(s) 722 can include a network interface card (NIC), a network adapter, a LAN adapter, or a physical, virtual, or logical address to connect to the tactical wireless base stations 600 or the base station 102, for example. To increase throughput when exchanging wireless data, the transceivers 722 can utilize multiple-input/multiple-output (MIMO) technology. The transceiver(s) 722 can comprise any sort of wireless transceivers capable of engaging in wireless, radio frequency (RF) communication. The transceivers 722 can also include other wireless modems, such as a modem for engaging in communications using wireless protocols such as WI-FI, WIMAX, BLUETOOTH, or infrared communication.

FIGS. 1-4 and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 8:
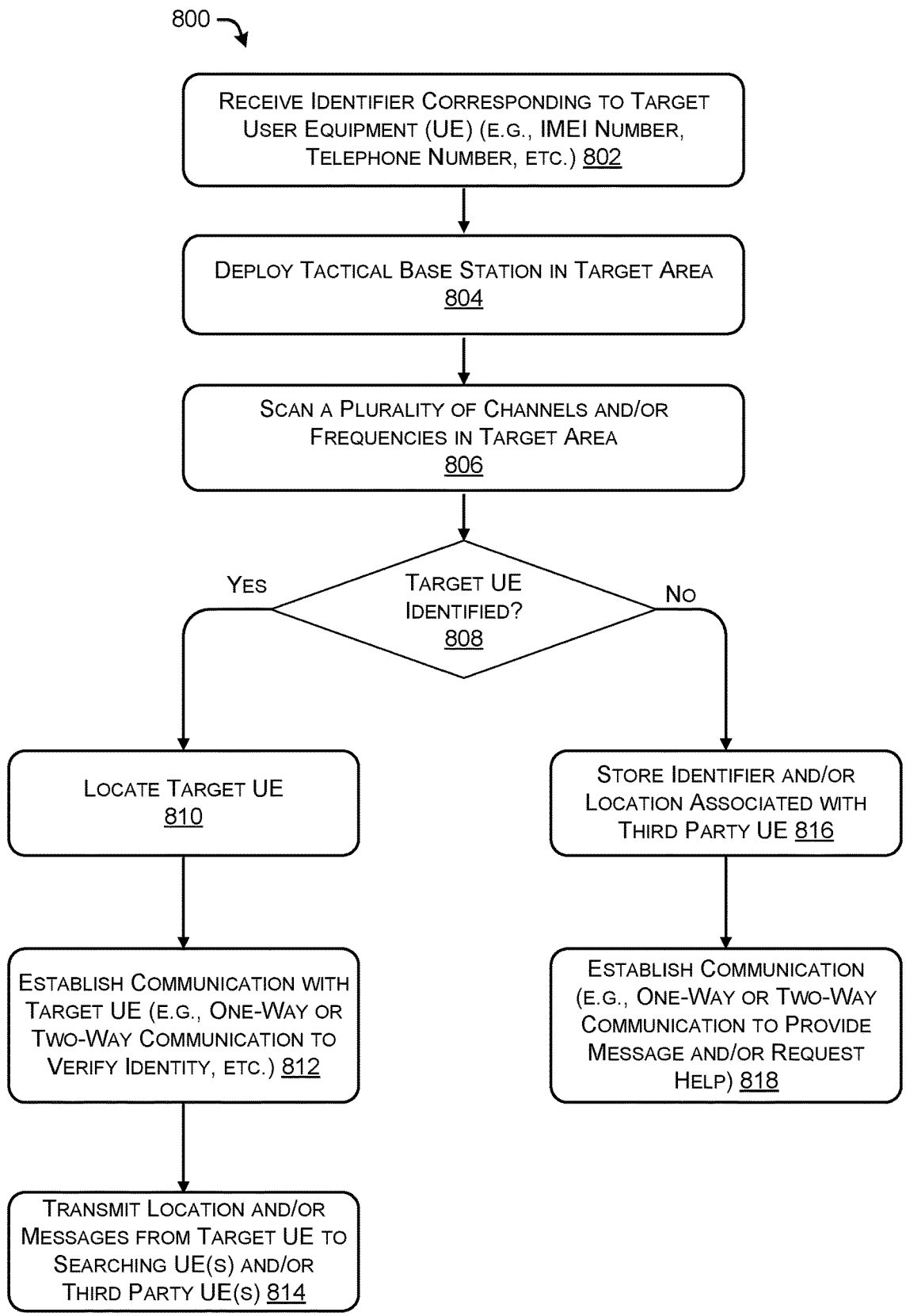
FIG. 8 illustrates an example process for deploying a tactical wireless base station to locate a target user equipment.

FIG. 8 illustrates an example process 800 for deploying a tactical wireless base station to locate a target user equipment. The example process 800 can be performed by a tactical wireless base station (e.g., the base station 600) deployed on the UAV 114, for example. Further, the example process 800 can be performed by a tactical wireless base station (e.g., the base station 600) deployed in a handheld unit, such as illustrated in FIG. 2. Further, some or all of the process 800 can be performed by one or more components in the environment 500.

At 802, the operation can include receiving an identifier corresponding to a target user equipment. In some examples, the identifier may include international mobile station equipment identity (IMEI), an international mobile subscriber identity (IMSI), a mobile identification number (MIN), a mobile subscription identification number (MSIN), electronic serial number (ESN), media access control address (MAC address), Internet protocol address (IP address), wireless protocol address such as a BLUETOOTH address, etc. In some instances, the identifier may be received at a centralized server and provided to a tactical wireless base station deployed on an unmanned aerial vehicle 114 or deployed as a handheld device.

At 804, the operation can include deploying a tactical base station in a target area. In some instances, this operation may include coupling the tactical base station with the UAV 114, for example, or including the tactical base station with searchers or rescuers. In some instances, the operation 804 may include determining a location to deploy the tactical base station (e.g., at a last known location of a missing hiker, or an area affected by or in risk of experiencing an emergency). In some instances, the operation 804 may include determining a number of tactical base stations to deploy.

At 806, the operation can include scanning a plurality of channels and/or frequencies in a target area. In some instance, the tactical wireless base station may transmit and/or receive on a plurality of channels and/or frequencies in serial or parallel, to detect any number of wireless signals, as discussed herein. For example, the tactical wireless base station may scan cellular protocol(s) to search for a wireless signal of a smartphone of a missing hiker.

At 808, the operation can include determining if the target user equipment is identified. In some instances, the operation 808 may include receiving a wireless signal associated with a user equipment. In some instances, it may be possible to determine an identity of the target UE by information contained in the wireless signal.

At 810, when the target user equipment is identified ("Yes" in the operation 808) the operation can include locating the target user equipment. In an example where the tactical wireless base station is deployed in a UAV, the operation 810 can include instructing the UAV to alter a direction of the UAV to determine a precise location of the target UE. In some instances, this may include monitoring a received signal strength indication (RSSI) and changing a direction of the UAV and determining if the RS SI increases, which may indicate that the UAV is moving closer to the target UE, or if the RSSI decreases, which may indicate that the UAV is moving away from the target UE. In some instances (e.g., in a case with multiple antennas), the tactical wireless base station may determine a direction of the signal by comparing time differences of the received signals. In an example where multiple tactical wireless base station are deployed as handheld devices, the tactical wireless devices may communicate to determine which device can receive a signal of the target UE, which may aid in determining a location of the target UE. Determining a location of the target UE may further include determine coordinates (e.g., GPS coordinates) of the location of the target UE.

At 812, the operation can include establishing a communication with the target UE (e.g., a one-way communication or a two-way communication to verify an identity of the user associated with the target UE, etc.). In some instances, this operation may include connecting the UE to a server hosted by the tactical wireless base station which includes an interface for communicating with the target UE. In some instances, this operation 812 may include conducing a voice interaction with the target UE, which may include automated speech and/or text to speech functionality from the tactical wireless base station to generate speech to interact with the target UE. In some instances, the communication may be via an application operating on the target UE, or may be a text message (e.g., an SMS/MMS) inquiring about the status and/or identity of the target UE. In some instances, the communication may be via Wireless Emergency Alerts and/or via the Commercial Mobile Alert System (e.g., the AMBER alert system).

At 814, the operation can include transmitting a location of the target UE and/or messages from the target UE to one or more searching UEs and/or third party UEs. In an example where the tactical wireless base station is deployed on a UAV, the operation 814 may include the tactical wireless base station acting as an intermediary with the target UE and establishing a communication link between the target UE and a fixed base station (e.g., as illustrated in FIG. 5). In some instances, the UAV may physically navigate towards searching UEs (e.g., UEs 208 of FIGS. 2 and 5) to establish a communication between the tactical wireless base station and the searching UEs. In some instances, the tactical wireless base station may transmit a determined location of the target UE to the searching UEs and/or the third party UEs so that the searching UEs or the third party UEs may come to the aid of (e.g., rescue) the target UE. In some instances, the process may include determining a location of the target UE and the third party UE, and providing an indication of the distance between the third party UE and the target UE to the third party UE, as well as a direction of travel.

Returning to the operation 808, if the target UE is not identified ("No" in operation 808), at 816, the operation can include storing an identifier and/or location associated with the third party UE. In an example where a tactical wireless base station is deployed in a UAV, the tactical wireless base station can store locations and/or identifiers of other UEs to convey messages to after finding the target UE, so that the third party UE may provide aid to the target UE.

At 818, the operation can include establishing a communication with the third party UE, which may include establishing a one-way or two way message with the third party UE to provide a message (e.g., from the centralized server 502 or from the target UE) to the third party UE and/or to request that the third party UE provide assistance to the target UE. Thus, the tactical wireless base station as described herein may facilitate in locating a target UE (such as a missing hiker) in areas without a wireless connection, and provide a location of the target UE to third party UEs so that the third party UEs may provide assistance to the target UE.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. An unmanned aerial vehicle (UAV) comprising:
  a propulsion mechanism;
  one or more processors;
  a radio interface configured to communicate via one or more wireless protocols; and
  memory storing computer-executable instructions that, when executed by the one or more processors, cause the UAV to perform operations comprising:
    moving to a deployment area associated with an emergency;
    establishing a connection with at least one device located in the deployment area via at least one of the one or more wireless protocols;
    authenticating the connection with the at least one device to indicate that the UAV is authorized to communicate with the at least one device via an emergency alert system, wherein the authenticating is based on credentials including a code, a password, an identification number, a public encryption key, or a private encryption key; and
    sending a message to the at least one device via the connection.
2. The UAV of claim 1, wherein the message is an alert associated with the emergency.

3. The UAV of claim 2, wherein the alert is an audio, video, text, or haptic indication of an event associated with the emergency.

4. The UAV of claim 1, wherein the message is an instruction to the at least one device to perform an action in response to the emergency.

5. The UAV of claim 1, wherein the at least one device is a mobile device configured to communicate with a telecommunication network using at least one of the one or more wireless protocols, such that the UAV communicates with the mobile device in place of the telecommunication network during the emergency.

6. The UAV of claim 1, wherein the at least one device is an Internet of Things (IoT) device.

7. The UAV of claim 1, wherein the emergency is a pending emergency and the at least one device is unable to reach a telecommunication network via the one or more wireless protocols within the deployment area.

8. The UAV of claim 1, wherein the emergency has caused an outage of a telecommunication network that uses the one or more wireless protocols within the deployment area.

9. A method, comprising:
receiving an indication of an emergency event;
in response to the indication of the emergency event, deploying a tactical wireless base station on an unmanned aerial vehicle (UAV) to a deployment area associated with the emergency event, wherein the tactical wireless base station is configured to communicate via one or more wireless protocols;
establishing, by the tactical wireless base station, communications with a plurality of user devices via at least one of the one or more wireless protocols;
authenticating, by the tactical wireless base station, the communications with individual ones of the plurality of user devices to indicate that the UAV is authorized to communicate via an emergency alert system; and
sending, by the tactical wireless base station, the indication of the emergency event or an emergency alert to the plurality of user devices via at least one of the one or more wireless protocols.

10. The method of claim 9, wherein the authenticating is based on credentials including a code, a password, an identification number, a public encryption key, or a private encryption key.

11. The method of claim 9, wherein the indication of the emergency event includes at least one of waypoints, navigation instructions, or a route directing the UAV to the deployment area.

12. The method of claim 9, wherein the indication of the emergency event or the emergency alert sent to the plurality of user devices is at least one of an audio indication, a video indication, a text indication, or a haptic indication.

13. A method, comprising:
receiving an indication of an emergency event;
in response to the indication of the emergency event, deploying a tactical wireless base station on an unmanned aerial vehicle (UAV) to a deployment area associated with the emergency event, wherein the tactical wireless base station is configured to communicate via one or more wireless protocols;
transmitting, by the tactical wireless base station, on a plurality of channels to discover a wirelessly enabled device via at least one of the one or more wireless protocols;
determining, by the tactical wireless base station, a type of the wirelessly enabled device and a capability of the wirelessly enabled device;
determining, by the tactical wireless base station, an instruction for the wirelessly enabled device based on the type of the wirelessly enabled device and the capability of the wirelessly enabled device, wherein the instruction indicates an action associated with the capability to be performed by the wirelessly enabled device; and
sending, by the tactical wireless base station, the instruction to the wirelessly enabled device.

14. The method of claim 13, wherein the wirelessly enabled device is a specific target wirelessly enabled device, and discovering the wirelessly enabled device comprises transmitting signals on the plurality of channels to search for the specific target wirelessly enabled device.

15. The method of claim 13, wherein the wirelessly enabled device is a wirelessly-actuated valve, and the instruction directs the wirelessly-actuated valve to open or close.

16. The method of claim 13, wherein the wirelessly enabled device is an autonomous vehicle, and the instruction includes directions for the autonomous vehicle to drive to a particular location.

17. The method of claim 13, wherein the wirelessly enabled device is a remotely-activated traffic signal, and the instruction is related to a specific traffic pattern.

18. The method of claim 13, wherein the indication of the emergency event includes at least one of waypoints, navigation instructions, or a route directing the UAV to the deployment area.

19. The method of claim 13, wherein the indication of the emergency event includes the instruction.

20. The method of claim 13, wherein the wirelessly enabled device is an Internet of Things (IoT) device.

* * * * *